US012799323B2

(12) United States Patent
Hungerland et al.

(10) Patent No.: US 12,799,323 B2
(45) Date of Patent: Nov. 17, 2026

(54) THERMALLY CONDUCTIVE FLAME-PROOF POLYCARBONATE COMPOSITIONS HAVING A HIGH COMPARATIVE TRACKING INDEX

(71) Applicant: Covestro Deutschland AG, Leverkusen (DE)

(72) Inventors: Tim Hungerland, Cologne (DE); Marius Nolte, Cologne (DE); Matthias Knaupp, Langenfeld (DE)

(73) Assignee: Covestro Deutschland AG, Leverkusen (DE)

( * ) Notice: Subject to any disclaimer, the term of this patent is extended or adjusted under 35 U.S.C. 154(b) by 242 days.

(21) Appl. No.: 18/856,305

(22) PCT Filed: Apr. 6, 2023

(86) PCT No.: PCT/EP2023/059147
§ 371 (c)(1),
(2) Date: Oct. 11, 2024

(87) PCT Pub. No.: WO2023/198591
PCT Pub. Date: Oct. 19, 2023

(65) Prior Publication Data

US 2025/0257209 A1 Aug. 14, 2025

(30) Foreign Application Priority Data

Apr. 14, 2022 (EP) .................................... 22168337

(51) Int. Cl.
*H01B 3/42* (2006.01)
*C08L 69/00* (2006.01)

(52) U.S. Cl.
CPC .............. *C08L 69/00* (2013.01); *H01B 3/426* (2013.01); *C08L 2201/02* (2013.01); *C08L 2203/20* (2013.01); *C08L 2203/30* (2013.01); *C08L 2205/03* (2013.01)

(58) Field of Classification Search
CPC ...... C08L 69/00; C08L 2201/02; H01B 3/426
See application file for complete search history.

(56) References Cited

U.S. PATENT DOCUMENTS

| | | | | |
|---|---|---|---|---|
| 2,393,967 | A | 2/1946 | Brubaker | |
| 3,671,487 | A | 6/1972 | Abolins | |
| 3,723,373 | A | 3/1973 | Lucas | |
| 3,838,092 | A | 9/1974 | Vogt et al. | |
| 5,288,778 | A | 2/1994 | Schmitter et al. | |
| 2011/0229704 | A1* | 9/2011 | Grcev | C08J 5/18 524/451 |
| 2014/0155549 | A1* | 6/2014 | Swinnen | C08L 69/00 264/328.17 |

FOREIGN PATENT DOCUMENTS

| | | | |
|---|---|---|---|
| CN | 111171542 | A | 5/2020 |
| EP | 0363608 | A1 | 4/1990 |
| EP | 0500496 | A1 | 8/1992 |
| EP | 0640655 | A2 | 3/1995 |
| EP | 0728811 | A2 | 8/1996 |
| EP | 0839623 | A1 | 5/1998 |
| WO | 9615102 | A2 | 5/1996 |
| WO | 9740092 | A1 | 10/1997 |
| WO | 2018037037 | A1 | 3/2018 |
| WO | 2020212245 | A1 | 10/2020 |

OTHER PUBLICATIONS

Acquasanta et al., Polymer Degradation and Stability, 2011, pp. 2098-2103, 96.
Freitag et al., Bayer AG, Polycarbonates, Encyclopedia of Polymer Science and Engineering, 1998, p. 648-718, vol. 11, Second Edition.
Grigo et al., Polycarbonate, Engineering Thermoplastics, Polycarbonate, Polyacetale, Polyester, Celluloseester, Kunststoff-Handbuch, Mar. 1, 1992, p. 117-299, Becker/Braun.
McCane, Fluoropolymers, Tetrafluoroethylene Polymers, Encyclopedia of Polymer Science and Technology, 1970, pp. 623-654, vol. 13, John Wiley & Sons, Inc., New York.
Modern Plastics Encyclopedia, 1970-1971, Oct. 1970, pp. 134 and 774, vol. 47, No. 10 A, McGraw-Hill, Inc., New York.
Modern Plastics Encyclopedia, 1975-1976, Oct. 1975, pp. 27, 28, and 472, vol. 52, No. 10 A, McGraw-Hill, Inc., New York.
Schildknecht, Vinyl and Related Polymers, 1952, pp. 484-494, John Wiley & Sons, Inc., New York.
Schnell, Chemistry and Physics of Polycarbonates, Polymer Reviews, 1964, p. 33, vol. 9, Interscience Publishers, New York.

* cited by examiner

*Primary Examiner* — Sherman Ng
(74) *Attorney, Agent, or Firm* — Richard P. Bender

(57) ABSTRACT

Described are thermally conductive flame-proof compositions which have a high comparative tracking index and contain bisphenol A homopolycarbonate, talc, phosphorus-containing flame retardant, fluorine-containing anti-drip agent, and anhydride-modified alpha-olefin polymer. Said compositions have a high comparative tracking index, thus allowing distances between electrical conductors in electronic and electrical components to be kept shorter than in the past.

16 Claims, No Drawings

THERMALLY CONDUCTIVE FLAME-PROOF POLYCARBONATE COMPOSITIONS HAVING A HIGH COMPARATIVE TRACKING INDEX

CROSS-REFERENCE TO RELATED APPLICATIONS

This application is the United States national phase of International Patent Application No. PCT/EP2023/059147 filed Apr. 6, 2023, and claims priority to European Patent Application No. 22168337.8 filed Apr. 14, 2022, the disclosures of which are hereby incorporated by reference in their entireties.

BACKGROUND

Technical Field

The invention relates to thermally conductive, flame-retardant thermoplastic compositions based on polycarbonate having high comparative tracking index.

Description of Related Art

On account of its high impact strength, high heat distortion resistance and a certain inherent flame retardancy, polycarbonate offers many advantages over other thermoplastic polymers. Due to this unique profile of properties, polycarbonate compositions are suitable in principle for a variety of different applications, for example in the field of electrical and electronic components. In particular, good insulation properties and high flame retardancy are essential safety-relevant basic requirements for materials used in this area.

In applications in which the plastic is in direct contact with the electrical conductor paths, a high resistance to tracking currents under voltage load is a prerequisite, in order for there not to be any short circuits within the component and hence a fire. The comparative tracking index (CTI) describes in general the resistance of a plastics material to environmental influences. The CTI value is a measure of the inclination of a plastic, under environmental influences, such as moisture and soiling, to form under voltage electrically conductive paths on the surface and promote resulting electrical tracking currents. The higher the tracking current resistance or the comparative tracking index (CTI value) of a material, the better suited it is for use in high-voltage applications, for example in modern-day electromobility applications. Another advantage of materials having a high CTI value is the possibility of placing electrical conductor paths in an EE component closer together without risking a short circuit, which in turn enables the reduction of component dimensions and thus more compact designs and weight savings.

In contrast to other thermoplastic polymers such as polystyrene, polyester, etc., polycarbonate itself has a very low comparative tracking index with moderate flame retardancy. Due to the high proportion of aromatic structures, polycarbonate has a rather high tendency to carbonize. The CTI of pure polycarbonate is about 250 V or even lower (F. Acquasanta et al., Polymer Degradation and Stability, 96 (2011), 2098-2103). However, for numerous applications in the electronics/electricals (EE) sector, for example in the electromobility sector, safety grounds require a higher CTI of the materials used. Polycarbonate has therefore to date not been considered as a material for a multitude of applications that specifically require a high comparative tracking index of the material.

For applications which require a high comparative tracking index of the material, the materials must at the same time also have a high flame retardancy, i.e. a V0 classification according to UL94V, in particular even at thin wall thicknesses.

Although pure polycarbonate typically already has a certain intrinsic flame retardancy (V2 classification according to UL94V), this is not sufficient for most applications in the EE sector. In order to achieve the required V0 classification according to UL94V, the addition of suitable flame retardants is required. Typically employed for polycarbonate are halogenated sulfonates (e.g. Rimar salt (potassium perfluorobutanesulfonate, C4 salt) or KSS salt (potassium diphenylsulfone 3-sulfonate)) or also organic phosphates (e.g. bisphenol A bis(diphenyl phosphate) (BDP), resorcinol bis(diphenyl phosphate) (RDP)) or phosphazenes. The flame retardancy of polycarbonate can in principle be adjusted very well with the addition of appropriate flame retardant additives. The mechanism of action of these flame retardants is however based on the formation of a solid, carbonized surface layer that interrupts the oxygen supply and thus inhibits the combustion process.

For instance, WO 2020/212245 A1 describes thermally conductive, polycarbonate-based compositions, containing 50% to 75% by weight of aromatic polycarbonate, 15% to 35% by weight of talc, 0.5% to 3% by weight of anhydride-modified alpha-olefin polymer, 0.4% to 0.6% by weight of fluorine-containing anti-drip agent, 3% to 10% by weight of phosphazene or 3% to 5% by weight of phosphoric ester and 3% to 10% by weight of barium sulfate, which is present as a flame retardant synergist.

However, the effect forming the basis for a good comparative tracking index is in turn, inter alia, a low tendency to form conductive paths on the surface. This is in direct contrast to the mechanism of action, the "charring", of surface-active flame retardants and thus poses a particular challenge in achieving a high comparative tracking index and good flame retardancy in a polycarbonate material.

Materials that have a high comparative tracking index are especially required in the field of electronic components or current-carrying components. Any current flow is associated with the generation of heat, which increases with increasing power. In order to prevent technical failure and to thus ensure the longevity of such components, it is necessary for the heat produced to be sufficiently dissipated. It would be desirable if it were possible to provide a polycarbonate material that has a relatively high comparative tracking index and flame retardancy and at the same time can also contribute to the dissipation of heat.

Thermally conductive polycarbonate material is known in principle from the prior art. For instance, WO 2018/037037 A1 describes corresponding compositions that have improved thermal conductivity due to the use of talc. The basic polymer degradation caused by the talc is largely suppressed by the addition of maleic anhydride-modified olefin wax, resulting in a material with advantageous mechanical properties. Such a material however does not feature good flame retardancy and the comparative tracking index is not significantly increased in comparison with pure polycarbonate either. Until now, experts have also been of the opinion that to date there are still no polycarbonate materials with high comparative tracking index.

SUMMARY

The object was therefore that of providing thermally conductive polycarbonate-based compositions that have a high CTI of at least 400 V, preferably of at least 450 V, preferably determined according to the rapid test method based on IEC 60112:2009, and preferably also achieve a UL94 V0 classification at 2 mm. The thermal conductivity (in-plane) should preferably be at least 1.0 W/(mK), determined according to ASTM E 1461-13. Due to the area of application and the heat development in EE components, the compositions should preferably also have a good heat distortion resistance, in particular a Vicat softening temperature, determined according to ISO 306:2014-3, VST method B, of at least 110 °C, preferably of at least 112 °C, particularly preferably of at least 115 °C.

Surprisingly, it has been found that an improvement in the comparative tracking index can be achieved by the addition of talc and that the object of providing compositions having the above complex profile of properties is achieved by the combination of aromatic polycarbonate with talc and with phosphorus-containing flame retardant, with anti-drip agent, and anhydride-modified α-olefin polymer, each in selected amount ranges.

DETAILED DESCRIPTION

The invention thus provides a thermoplastic composition, containing

- A) at least 50% by weight of bisphenol A homopolycarbonate,
- B) 32% to 37% by weight of talc,
- C) 4% to 10% by weight of phosphorus-containing flame retardant,
- D) 0.3% to 2% by weight of fluorine-containing anti-drip agent,
- E) 1% to 3% by weight of anhydride-modified α-olefin polymer, wherein the composition does not contain any further fillers.

In addition to components A, B, C, D and E, the composition according to the invention may contain further components, for instance further additives in the form of component F. The composition may also contain, as blend partners (component G), one or more further thermoplastics that are different from the above-mentioned components and are not covered by any of components A to F. In the context of the present invention—unless explicitly stated otherwise—the stated % by weight values for components A, B, C, D, E, optionally F and optionally G are each based on the total weight of the composition. It will be appreciated that all of the components present in a composition according to the invention sum to 100% by weight. Where a numerical range has its upper limit indicated by "to X", this includes the numerical value specified and its upward rounding range.

Thermoplastic polymers that are different from components A, E and F and are suitable as blend partner include for example further aromatic polycarbonate that is not a bisphenol A homopolycarbonate, i.e. is different from component A, polystyrene, styrene copolymers, aromatic polyesters such as polyethylene terephthalate (PET) or polybutylene terephthalate (PBT), PET-cyclohexanedimethanol copolymer (PETG), polyethylene naphthalate (PEN), PMMA and PMMA copolymers, PMMI, polyolefins such as polyethylene or polypropylene, and copolymers with styrene such as transparent polystyrene-acrylonitrile (PSAN) or else also thermoplastic polyurethanes.

It is very particularly preferable when the above-described compositions do not contain any further components, and instead the amounts of components A, B, C, D, E, optionally F, optionally G, in particular in the preferred embodiments described, add up to 100% by weight, i.e. the compositions according to the invention consist of components A, B, C, D, E, optionally F, optionally G, exceptionally preferably of components A to F.

It will be appreciated that the components used may contain typical impurities arising for example from their production processes. It is preferable to use the purest possible components. It will further be appreciated that these impurities may also be present in the event of an exhaustive formulation of the composition.

The invention also provides moldings, produced from the thermoplastic compositions according to the invention, i.e. moldings consisting of a thermoplastic composition according to the invention or comprising a region made from a thermoplastic composition according to the invention. Such moldings are in particular those in which the aforementioned profile of properties is particularly attractive, i.e. moldings which are parts of components from the EE sector, in particular of high-voltage switches, inverters, relays, electronic connectors, electrical connectors, circuit breakers, components for photovoltaic applications, electric motors, heat sinks, chargers and charging plugs for electric vehicles, electrical junction boxes, smart meter housings, miniature circuit breakers, busbars. The component is preferably designed for an operating voltage of at least 400 V. To this end, the material advantageously used preferably has a comparative tracking index of at least 400 V, in particular at least 450 V, determined as described above according to the rapid test method based on IEC 60112:2009.

The compositions according to the invention exhibit no significant tracking current (>0.5 A over 2 s) when at least 50 drops of a 0.1% ammonium chloride solution are applied at 400 V, further preferably at 450 V, with the test preferably being carried out according to the rapid test method based on IEC 60112:2009 and described in the description part. The compositions according to the invention additionally have a flame retardancy V0 according to UL94V in thicknesses of the test specimens of 2 mm. In addition to the high CTI and the good flame retardancy, the compositions preferably also have a good heat distortion resistance, which is manifested in a Vicat softening temperature, determined according to ISO 306:2014-3, VST method B, of at least 110 °C, preferably of at least 112 °C, in particular of 115 °C.

The individual constituents of the compositions according to the invention are more particularly elucidated hereinbelow:

Component A

Component A of the thermoplastic compositions according to the invention is bisphenol A homopolycarbonate, i.e. an aromatic polycarbonate based on the sole monomer unit bisphenol A.

The melt volume flow rate MVR of the aromatic bisphenol A homopolycarbonate used, determined according to ISO 1133:2012-03, at a test temperature of 300 °C and with 1.2 kg load, is preferably 5 to 35 $cm^3$/(10 min), further preferably 6 to 21 $cm^3$/(10 min), particularly preferably 10 to 19 $cm^3$/(10 min), very particularly preferably 11 to 15 $cm^3$/(10 min).

Details of the preparation of polycarbonates have been set out in many patent specifications over the past 40 years or so. Reference may be made here by way of example to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, Volume 11, Second Edition, 1988, pages 648-718 and finally to U. Grigo, K. Kirchner and P. R. Müller "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117 to 299.

Aromatic polycarbonates are prepared, for example, by reaction of dihydroxyaryl compounds with carbonyl halides, preferably phosgene, and/or with aromatic dicarbonyl dihalides, preferably benzenedicarbonyl dihalides, by the interfacial process, optionally with use of chain terminators and optionally with use of trifunctional or more than trifunctional branching agents. Likewise possible is preparation via a melt polymerization process, by reacting dihydroxyaryl compounds with, for example, diphenyl carbonate.

In the case of bisphenol A homopolycarbonate, solely bisphenol A is used as dihydroxyaryl compound.

In the preparation of the bisphenol A homopolycarbonate, preferred chain terminators are phenols having substitution by one or more linear or branched, preferably unsubstituted, $C_1$- to $C_{30}$-alkyl radicals, or by tert-butyl. Particularly preferred chain terminators are phenol, cumylphenol and/or p-tert-butylphenol. The amount of chain terminator to be used is preferably 0.1 to 5 mol %, based on moles of dihydroxyaryl compounds used in each case. The chain terminators may be added before, during or after the reaction with a carbonic acid derivative.

In principle, the homopolycarbonate may also be branched.

Suitable branching agents are the trifunctional or more than trifunctional compounds known in polycarbonate chemistry, in particular those having three or more than three phenolic OH groups.

Examples of suitable branching agents include 1,3,5-tri (4-hydroxyphenyl)benzene, 1,1,1-tri (4-hydroxyphenyl) ethane, tri (4-hydroxyphenyl)phenylmethane, 2,4-bis(4-hydroxyphenylisopropyl) phenol, 2,6-bis(2-hydroxy-5'-methylbenzyl)-4-methylphenol, 2-(4-hydroxyphenyl)-2-(2,4-dihydroxyphenyl) propane, tetra(4-hydroxyphenyl) methane, tetra(4-(4-hydroxyphenylisopropyl) phenoxy) methane and 1,4-bis((4',4"-dihydroxytriphenyl)methyl)benzene and 3,3-bis(3-methyl-4-hydroxyphenyl)-2-oxo-2,3-dihydroindole.

The amount of any branching agents to be used is preferably 0.05 mol % to 2.00 mol %, based on moles of bisphenol A used in each case.

The branching agents can either form an initial charge with the bisphenol A and the chain terminators in the aqueous alkaline phase or can be added, dissolved in an organic solvent, before the phosgenation. In the case of the transesterification process, the branching agents are used together with the bisphenol A.

As additional blend partner according to component G, further aromatic polycarbonates may in principle also be present in the compositions according to the invention, provided that they do not negatively impact the profile of properties desired according to the invention of high comparative tracking index and also good flame retardancy at 2 mm and also do not lower the Vicat temperature too far, i.e. preferably not below a Vicat temperature of 110 °C, preferably not below 112 °C, in particular not below 115 °C.

The thermoplastic compositions according to the invention contain at least 50% by weight, preferably at least 54% by weight, of aromatic bisphenol A homopolycarbonate, and are thus based on aromatic polycarbonate.

Component B

Talc in the context of the present invention is preferably a talc of essentially the same chemical composition, particle diameter, porosity and/or BET surface area, or a talc mixture.

Talc is generally a phyllosilicate. It can be described as magnesium silicate hydrate having the general chemical composition $Mg_3[Si_4O_{10}(OH)_2]$. However, different types of talc contain different impurities, and so there may be deviations from this general composition.

The talc used or the talc mixture for the preparation of the composition according to the invention may be sized or unsized. The talc is preferably unsized. In the context of the present invention, a size is considered to be a controlled (chemi- or physisorbed) enrichment of molecules at the surface. Unsized talc is thus non-surface-treated talc, meaning that, after the talc particles having the desired particle diameter have been recovered and optionally subjected to compaction, the talc preferably has not been subjected to any further process step that alters the surface of the talc in a controlled manner by chemisorption and/or physisorption. However, this does not rule out the unintentional arrival of impurities, dust or similar particles on parts of the surface during the further handling of the talc, provided that the surface of the talc does not lose its properties to any significant degree, especially in relation to the pH.

The talc preferably has a pH of 8 to 10, particularly preferably 8.5 to 9.8, very particularly preferably 9.0 to 9.7, where the pH is determined according to EN ISO 787-9:1995. It should be noted that EN ISO 787-9:1995 also mentions the option of adding ethanol or other organic solvents to improve the dispersion of the solid to be analyzed. Preference is given according to the invention to using only distilled water for the determination of the pH according to EN ISO 787-9:1995.

Component B, the talc, preferably has a content of iron (II) oxide and/or iron (III) oxide of 0.2% to 2.5% by weight, particularly preferably 0.3% to 2.is b3% by weight, very particularly preferably from 0.3% to 2.0% by weight. This content is preferably measured by x-ray fluorescence or atomic absorption spectroscopy. The content of iron oxide in the talc has an influence on the degree of degradation of the polycarbonate. It is advantageous to use talc with the specified iron oxide content.

Likewise preferably, component B has a content of aluminum oxide of 0.01% to 0.5% by weight, particularly preferably of 0.05% to 0.48% by weight, very particularly preferably of 0.15% to 0.45% by weight.

Component B preferably has an average particle diameter D50 of 0.01 to 10 μm, particularly preferably 0.25 to 10.00 μm, further preferably 0.5 to 10.00 μm, particularly preferably of 1 to 5 μm, where the particle diameter D50 is determined by sedimentation analysis. The average D50 value is understood by those skilled in the art to mean an average particle diameter at which 50% of the particles are smaller than the defined value. The particle diameter D50 is preferably determined according to ISO13317-3:2001.

Component B preferably has a BET surface area of 7.5 to 20.0 $m^2/g$, particularly preferably of 9.0 to 15.0 $m^2/g$, very particularly preferably 9.5 to 14.0 $m^2/g$. The determination of the surface area according to Brunauer, Emmett and Teller by means of gas adsorption is known per se to those skilled in the art. The BET surface area is preferably determined according to ISO 4652:2012-06. This preferred BET surface area is particularly preferably linked to the above-described average particle diameter D50 of the talc. It has been found that, in the case of such a combination, component B used according to the invention is optimally matched to component C used according to the invention. By way of the specific acid number and molar mass of component E, the degradation of the polycarbonate caused by component B can be minimized.

Particularly preferably, the talc has a talc content of >96% by weight, particularly preferably >97% by weight, very particularly preferably ≥98% by weight.

It is likewise preferable that the talc has an ignition loss at 1050 °C of 5.0% to 7.0% by weight, particularly preferably of 5.2% to 6.5% by weight and very particularly preferably of 5.3% to 6.2% by weight. The ignition loss is preferably determined by means of DIN51081:2002.

The talc, which may also be a talc mixture, according to component B is preferably in compacted form. If it is a talc mixture, the abovementioned figures are each based on the talc mixture, i.e. component B in its entirety.

The compositions according to the invention have a talc content of 32% to 37% by weight, preferably of 34% to 36% by weight, particularly preferably of 34.5% to 35.5% by weight, based on the overall composition.

Component C

Component C of the compositions according to the invention is phosphorus-containing flame retardants. It may be a single phosphorus-containing flame retardant, but it may also be a mixture of various phosphorus-containing flame retardants.

Preferred phosphorus-containing flame retardants are cyclic phosphazenes, phosphorus compounds of formula (10), and mixtures thereof:

(10)

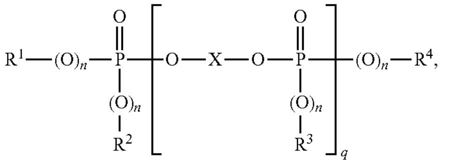

in which $R^1$, $R^2$, $R^3$ and $R^4$ are independently a $C_1$- to $C_8$-alkyl radical, in each case optionally halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl, and/or halogen, preferably chlorine and/or bromine, n is independently 0 or 1, q is a value from 0 to 30 and X is a mono- or polycyclic aromatic radical having 6 to 30 carbon atoms or a linear or branched aliphatic radical having 2 to 30 carbon atoms, each of which may be substituted or unsubstituted, and bridged or unbridged.

Preferably, $R^1$, $R^2$, $R^3$ and $R^4$ are independently branched or unbranched $C_1$- to $C_4$-alkyl, phenyl, naphthyl or $C_1$- to $C_4$-alkyl-substituted phenyl. In the case of aromatic $R^1$, $R^2$, $R^3$ and/or $R^4$ groups, these may in turn be substituted by halogen and/or alkyl groups, preferably chlorine, bromine and/or $C_1$- to $C_4$-alkyl, branched or unbranched. Particularly preferred aryl radicals are cresyl, phenyl, xylenyl, propylphenyl or butylphenyl, and also the corresponding brominated and chlorinated derivatives thereof.

X in formula (10) is preferably derived from dihydroxyaryl compounds.

X in formula (10) is particularly preferably (Xi)

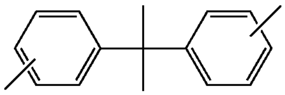, (Xii)

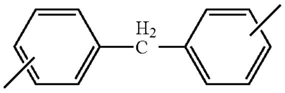, (Xiii)

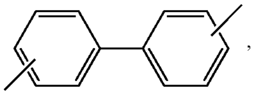,

-continued (XiV)

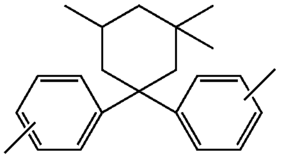

or the chlorinated and/or brominated derivatives thereof. X (together with the adjoining oxygen atoms) is preferably derived from hydroquinone, bisphenol A or diphenylphenol. It is likewise preferable for X to be derived from resorcinol. Particularly preferably, X is derived from bisphenol A. n in formula (10) is preferably equal to 1. q is preferably 0 to 20, particularly preferably 0 to 10, and in the case of mixtures is average values from 0.8 to 5.0, preferably 1.0 to 3.0, further preferably 1.05 to 2.00 and particularly preferably from 1.08 to 1.60.

The phosphorus compound of general formula (10) is preferably a compound of formula (11):

(11)

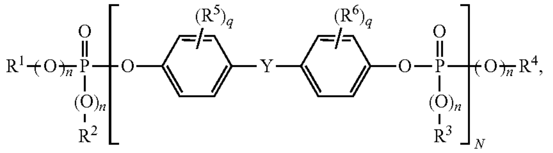

in which $R^1$, $R^2$, $R^3$ and $R^4$ are each independently a linear or branched $C_1$- to $C_8$-alkyl radical and/or optionally linear- or branched-alkyl-substituted $C_5$- to $C_6$-cycloalkyl radical, $C_6$- to $C_{10}$-aryl radical or $C_7$- to $C_{12}$-aralkyl radical, n is independently 0 or 1, q is independently 0, 1, 2, 3 or 4, N is a number between 1 and 30, $R_5$ and $R_6$ are independently linear or branched $C_1$- to $C_4$-alkyl radical, preferably methyl radical, and Y is linear or branched $C_1$- to $C_7$-alkylidene, a linear or branched $C_1$- to $C_7$-alkylene radical, $C_5$- to $C_{12}$-cycloalkylene radical, $C_5$- to $C_{12}$-cycloalkylidene radical, —O—, —S—, —SO—, $SO_2$ or —CO—.

Phosphorus compounds of formula (10) are in particular tributyl phosphate, triphenyl phosphate, tricresyl phosphate, diphenyl cresyl phosphate, diphenyl octyl phosphate, diphenyl 2-ethylcresyl phosphate, tri (isopropylphenyl)phosphate, resorcinol-bridged oligophosphate and bisphenol A-bridged oligophosphate. If phosphorus compounds of formula (10) are used, the use of oligomeric phosphoric esters of formula (10) which are derived from bisphenol A is especially preferred.

Further preference is given to using mixtures of identical structure and different chain length, with the stated q value being the average q value. The average q value is determined by determining the composition of the phosphorus compound mixture (molecular weight distribution) by means of high pressure liquid chromatography (HPLC) at 40 °C in a mixture of acetonitrile and water (50:50) and using this to calculate the average values of q.

Particularly preferably, bisphenol A-based oligophosphate (bisphenol A bis(diphenyl phosphate)) according to formula (12) with q=1 to 20, in particular with q=1.0 to 1.2, is present in the compositions according to the invention.

(12)

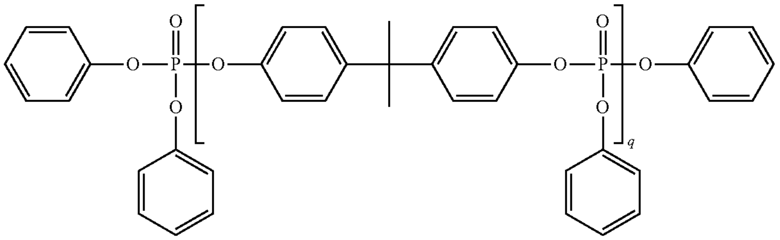

Phosphorus compounds of this kind are known (cf., for example, EP 0 363 608 A1, EP 0 640 655 A2) or can be prepared in an analogous manner by known methods (e.g. Ullmanns Enzyklopädie der technischen Chemie [Ullmann's Encyclopedia of Industrial Chemistry], vol. 18, p. 301 ff., 1979; Houben-Weyl, Methoden der organischen Chemie [Methods of Organic Chemistry], vol. 12/1, p. 43; Beilstein vol. 6, p. 177).

Alternatively, cyclic phosphazenes according to formula (13) are particularly preferably used as component C:

(13)

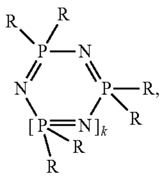

where

R in each case is identical or different and is
- an amine radical,
- an in each case optionally halogenated, preferably fluorine-halogenated, further preferably monohalogenated, $C_1$- to $C_8$-alkyl radical, preferably methyl radical, ethyl radical, propyl radical or butyl radical,
- a $C_1$- to $C_8$-alkoxy radical, preferably a methoxy radical, ethoxy radical, propoxy radical or butoxy radical,
- an in each case optionally alkyl-substituted, preferably $C_1$- to $C_4$-alkyl-substituted, and/or halogen-substituted, preferably chlorine- and/or bromine-substituted, $C_5$- to $C_6$-cycloalkyl radical,
- an in each case optionally alkyl-substituted, preferably $C_1$- to $C_4$-alkyl-substituted, and/or halogen-substituted, preferably chlorine-, bromine-, and/or hydroxy-substituted, $C_6$- to $C_{20}$-aryloxy radical, preferably phenoxy radical, naphthyloxy radical,
- an in each case optionally alkyl-substituted, preferably $C_1$- to $C_4$-alkyl-substituted, and/or halogen-substituted, preferably chlorine- and/or bromine-substituted, $C_7$- to $C_{12}$-aralkyl radical, preferably phenyl-$C_1$- to $C_4$-alkyl radical, or
- a halogen radical, preferably chlorine or fluorine, or
- an OH radical, k is a whole number from 1 to 10, preferably a number from 1 to 8, particularly preferably 1 to 5, very particularly preferably 1.

Commercially available phosphazenes are preferably used here. These are typically mixtures of rings of different ring sizes.

Further preference is given, either individually or in a mixture, to: propoxyphosphazene, phenoxyphosphazene, methylphenoxyphosphazene, aminophosphazene, fluoroalkylphosphazenes, and also phosphazenes having the following structures:

(13a-f)

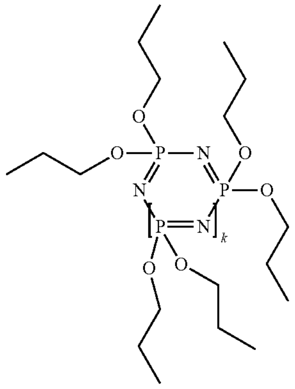

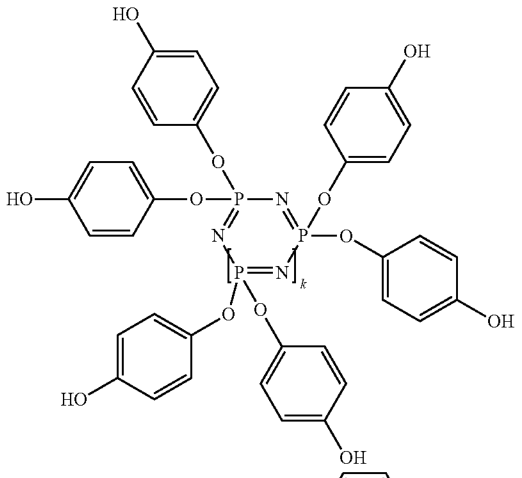

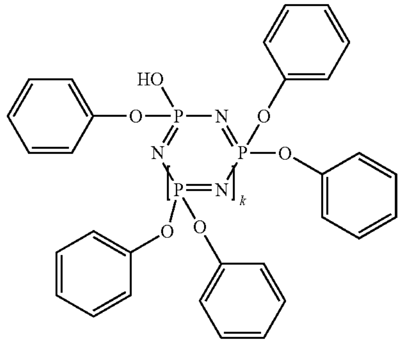

-continued

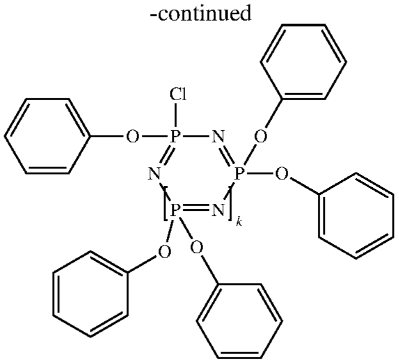

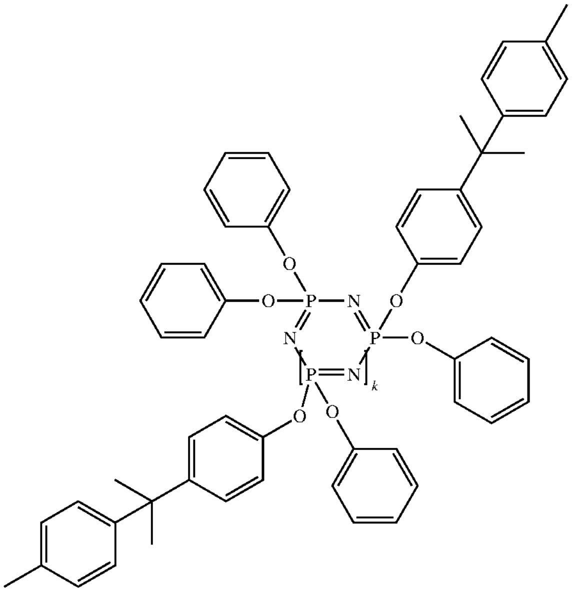

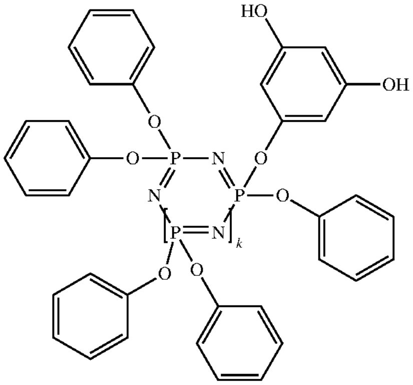

In the compounds 13a-f shown above, k=1, 2 or 3.

Preferably, the proportion of phosphazenes that are halogen-substituted on the phosphorus, for example composed of incompletely reacted starting material, is less than 1000 ppm, further preferably less than 500 ppm.

The phosphazenes can be used alone or in a mixture. The radical R may always be the same or two or more radicals in the formulae may be different. The radicals R of a phosphazene are preferably identical.

In one embodiment, solely phosphazenes having the same R are used.

Preferably, the proportion of tetramers (k=2) is from 2 to 50 mol %, based on component C, further preferably from 5 to 40 mol %, further preferably still from 10 to 30 mol %, particularly preferably from 10 to 22 mol %.

Preferably, the proportion of higher oligomeric phosphazenes (k=3, 4, 5, 6 and 7) is from 0 to 30 mol %, based on component C, further preferably from 2.5 to 25 mol %, further preferably still from 5 to 20 mol %, and particularly preferably from 6-15 mol %.

Preferably, the proportion of oligomers with k≥8 is from 0 to 2.0 mol %, based on component C, and preferably from 0.10 to 1.00 mol %.

Further preferably, the phosphazenes of component C satisfy all three above-mentioned conditions with respect to the proportions of oligomers.

Particularly preferably present as component C is phenoxyphosphazene (all R=phenoxy, formula 13g), alone or with further phosphazenes according to formula (13) as component C, with a proportion of oligomers with k=1 (hexaphenoxyphosphazene) of 50 to 98 mol %, particularly preferably 60 to 72% by weight, based on the amount of phenoxyphosphazene. If phenoxyphosphazene is used, the proportion of oligomers with k=2 is very particularly preferably: 15% to 22% by weight and with k≥3: 10% to 13% by weight.

(13g)

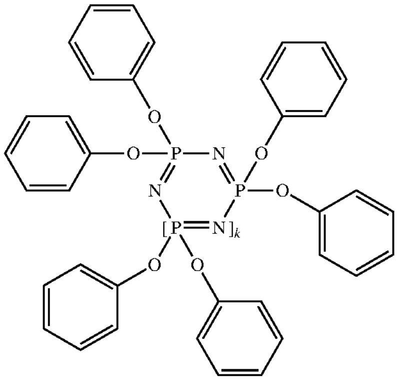

Alternatively, component C very particularly preferably comprises, and very particularly preferably is, a phenoxyphosphazene having a trimer proportion (k=1) of 70 to 85 mol %, a tetramer proportion (k=2) of 10 to 20 mol %, a proportion of higher oligomeric phosphazenes (k=3, 4, 5, 6 and 7) of 3 to 8 mol % and phosphazene oligomers with k≥8 of 0.1 to 1 mol %, based on component C.

In an alternative preferred embodiment, n, defined as the arithmetic mean of k, is in the range from 1.10 to 1.75, preferably from 1.15 to 1.50, further preferably from 1.20 to 1.45, and particularly preferably from 1.20 to 1.40 (range boundaries included).

$$n = \frac{\sum_{i=1}^{max} k_i \cdot x_i}{\sum_{i=1}^{max} x_i} \tag{14}$$

Phosphazenes and the preparation thereof are described, for example, in EP 728 811 A2, DE 1961668 A and WO 97/40092 A1.

The oligomer compositions in the respective blend samples can be detected and quantified after compounding by means of 31P NMR (chemical shift; 8 trimer: 6.5 to 10.0 ppm; δ tetramer: −10 to −13.5 ppm; δ higher oligomers: −16.5 to −25.0 ppm).

Particularly preferably, component C comprises bisphenol A-based oligophosphate according to formula (12) and/or cyclic phosphazene according to formula (13); very particularly preferably, component C is bisphenol A-based oligophosphate according to formula (12) and/or cyclic phosphazene according to formula (13); exceptionally preferably, component C is cyclic phosphazene according to formula (13).

The proportion of phosphorus-containing flame retardant in the compositions according to the invention is 4% by weight to 10% by weight, preferably 5% by weight to 8% by weight, particularly preferably 5.0% to 8.0% by weight, based on the overall composition.

The higher the amount of phosphorus-containing flame retardant used, the further the Vicat temperature is lowered. In the case of amounts of more than 10% by weight, the Vicat temperature is lowered to such an extent that the material is no longer suitable for applications for which polycarbonate can be used due to its inherently high heat resistance.

Component D

The compositions according to the invention contain as component D a fluorine-containing anti-drip agent, which may be a mixture of two or more anti-drip agents. The total amount of anti-drip agent (anti-dripping agent) is 0.3% by weight to 2% by weight, preferably 0.3% by weight to 1.0% by weight, particularly preferably 0.4% by weight to 0.7% by weight, based on the overall composition, of at least one anti-drip agent.

The anti-drip agent used is preferably fluorine-containing polymer, in particular polyolefin.

The fluorinated polyolefins used with preference as anti-drip agents have high molecular weight and have glass transition temperatures of above −30 °C, generally of above 100 °C, and fluorine contents preferably from 65% by weight to 76% by weight, in particular from 70% to 76% by weight. Preferred fluorinated polyolefins are polytetrafluoroethylene, polyvinylidene fluoride, tetrafluoroethylene/hexafluoropropylene copolymers and ethylene/tetrafluoroethylene copolymers. Fluorinated polyolefins are known (cf. “Vinyl and Related Polymers” by Schildknecht, John Wiley & Sons, Inc., New York, 1962, pages 484-494; “Fluoropolymers” by Wall, Wiley-Interscience, John Wiley & Sons, Inc., New York, volume 13, 1970, pages 623-654; “Modern Plastics Encyclopedia”, 1970-1971, volume 47, No. 10 A, October 1970, McGraw-Hill, Inc., New York, pages 134 and 774; “Modern Plastics Encyclopedia”, 1975-1976 October 1975, volume 52, No. 10 A, McGraw-Hill, Inc., New York, pages 27, 28 and 472 and U.S. Pat. No. 3,671,487 A, 3 723 373 A and 3 838 092 A). They can be prepared by known methods, for example by polymerizing tetrafluoroethylene in aqueous medium with a free-radical-forming catalyst, for example sodium, potassium or ammonium peroxydisulfate, at pressures from 7 to 71 kg/cm$^2$ and at temperatures from 0 to 200 °C, preferably at temperatures from 20 to 100 °C. Further details are described, for example, in U.S. Pat. No. 2,393,967 A.

Depending on the use form, the density of the fluorinated polyolefins can lie between 1.2 and 2.3 g/cm$^3$, preferably 2.0 g/cm$^3$ to 2.3 g/cm$^3$, determined according to ISO 1183-1 (2019-09), and the average particle size between 0.05 and 1000 μm, determined by means of light microscopy or white light interferometry.

Suitable tetrafluoroethylene polymer powders are commercial products and are available by way of example from DuPont under the trade name Teflon®.

Particular preference is given to using polytetrafluoroethylene (PTFE), as such, but also in the form of a PTFE-containing composition, as fluorine-containing anti-drip agent. If a PTFE-containing composition is used as fluorine-containing anti-drip agent, the minimum use amount thereof is enough for at least 0.2% by weight, preferably at least 0.21% by weight, particularly preferably at least 0.25% by weight, of PTFE to be present in the overall composition. The PTFE-containing compositions include Hostaflon® TF2021 or PTFE blends such as Blendex® B449 (about 50% by weight of PTFE and about 50% by weight of SAN [from 80% by weight of styrene and 20% by weight of acrylonitrile]) from Chemtura. Very particular preference is given to using PTFE or a PTFE/SAN blend as fluorine-containing anti-drip agent; exceptionally preferably, the fluorine-containing anti-drip agent is PTFE or PTFE/SAN.

Component E

Component E of the compositions according to the invention is an anhydride-modified α-olefin polymer.

The α-olefin polymer is preferably based on at least one monomer selected from the group consisting of ethylene, 1-propene, 1-butene, 1-isobutene, 1-pentene, 1-hexene, 1-heptene, 1-octene, 1-nonene, 1-decene, 1-undecene, 1-dodecene, 1-tridecene, 1-tetradecene, 1-octadecene, 1-nonadecene, but may also be based on mixtures of these monomers. Further preferably, the α-olefin polymer is based on at least one monomer selected from the group consisting of ethene, propene, 1-hexene, 1-octene. Particularly preferably, the α-olefin polymer is based on ethylene, propene and/or 1-octene.

In this context, “based on” means that preferably at least 90% by weight, further preferably at least 95% by weight, particularly preferably at least 98% by weight, based on the total weight of the respective α-olefin polymer, without anhydride modification, in the polycarbonate-containing composition, of the α-olefin polymer has been formed from the respective monomer(s).

The α-olefin polymer has been modified with an anhydride, using an unsaturated carboxylic anhydride for the modification. The carboxylic anhydride is preferably selected from the group consisting of maleic anhydride, phthalic anhydride, fumaric anhydride, itaconic anhydride and mixtures thereof. Particular preference is given to maleic anhydride.

The anhydride-modified α-olefin polymer is preferably free of styrene-butadiene rubber, very particularly preferably rubber-free.

A preferred anhydride-modified α-olefin polymer comprises

- E1) 90.0-99.5% by weight, preferably 92.0-97.5% by weight, further preferably 94.0-97.0% by weight, of α-olefin polymer and
- E2) 0.5-10.0% by weight, further preferably 2.5-8.0% by weight, further preferably still 3.0-6.0% by weight, of anhydride.

The olefinic portion E1) of the α-olefin polymer here is particularly preferably characterized in that the ethylene proportion is 65.0-96.0% by weight, further preferably 80.0-96.0% by weight, very particularly preferably 84.0-92.0% by weight, the propylene proportion is 2.0-10.0% by weight, very particularly preferably 4.0-8.0% by weight, and the 1-octene proportion is 2.0-25.0% by weight, further preferably 2.0-10.0% by weight, very particularly preferably 4.0-8.0% by weight.

Very particularly preferably, the α-olefin polymer is not based on any further monomers.

Alternatively, the olefinic portion E1) of the alpha-olefin polymer is particularly preferably based on propylene and/or ethylene, very particularly preferably to an extent of at least 98% by weight. Exceptionally preferably, the sole monomer unit of the alpha-olefin polymer is propylene.

The average molecular weight $M_W$ of the anhydride-modified α-olefin polymer is preferably 300 to 40 000 g/mol, further preferably 800 to 32 000 g/mol, further preferably still 1000 to 22 000 g/mol, particularly preferably 3000 to 21 000 g/mol. The molecular weight $M_W$ is determined by means of gel permeation chromatography in ortho-dichlorobenzene at 150 °C with polystyrene calibration. Here, the value stated is preferably the average value from a duplicate determination.

The acid number of the anhydride-modified α-olefin polymer is preferably at least 30 mg KOH/g, further preferably 45 to 170 mg KOH/g, particularly preferably to 100 mg KOH/g, determined according to DIN ISO 17025:2005-08 by means of potentiometric titration with alcoholic potassium hydroxide solution.

Very particularly preferably, the anhydride-modified α-olefin polymer according to component E is based on propene, is maleic anhydride-modified and further preferably has an average molecular weight $M_w$, determined by means of gel permeation chromatography in ortho-dichlorobenzene at 150 °C with polystyrene calibration, of 1000 to 22 000 g/mol, further preferably still 3000 to 21 000 g/mol, and an acid number of 45 to 170 mg KOH/g, further preferably still of 50 to 100 mg KOH/g, determined according to DIN ISO 17025:2005-08 by means of potentiometric titration.

The amount of anhydride-modified α-olefin polymer in the overall composition is 1% by weight to 3% by weight, preferably 1.2% by weight to 2.5% by weight, further preferably 1.3% by weight to 2.3% by weight, particularly preferably 1.4% by weight to 2% by weight, in particular to 1.6% by weight.

Further Additives (Component F)

The polycarbonate compositions according to the invention may contain one or more further additives different from components B, C, D and E, which are subsumed in the present case under "component F".

Optionally (0% by weight), preferably up to 10% by weight, further preferably still 0.1% by weight to 5% by weight, particularly preferably 0.1% by weight to 3% by weight, very particularly preferably 0.2% by weight to 1.0% by weight, of other customary additives ("further additives") are present, these percentages by weight being based on the total weight of the composition. The group of the further additives does not include any talc (component B) and any phosphorus-containing flame retardant according to component C. The group of the further additives also does not include any fluorine-containing anti-drip agent, as this is already described as component D, and also any anhydride-modified α-olefin polymer according to component E.

Such further additives, as are typically added to polycarbonates, are in particular heat stabilizers, antioxidants, mold-release agents, UV absorbers, IR absorbers, impact modifiers, antistats, flame retardants different from component C, optical brighteners, light-scattering agents, hydrolysis stabilizers, transesterification stabilizers, (organic) dyes, (organic/inorganic) pigments, compatibilizers and/or additives for laser marking, in particular in the amounts typical for polycarbonate-based compositions. Such additives are described, for example, in EP 0 839 623 A1, WO 96/15102 A1, EP 0 500 496 A1 or in "Plastics Additives Handbook", Hans Zweifel, 5th Edition 2000, Hanser Verlag, Munich. These additives may be added individually or else in a mixture and are additives that are preferred according to the invention.

Further preferably present as further additives, where further additives are present at all, are one or more further additives selected from the group consisting of heat stabilizers, antioxidants, mold-release agents, organic dyes, organic pigments, inorganic pigments. In particular, the proportion of further additives is preferably 0% to 3% by weight. Very particularly preferably present as further additive is at least one heat stabilizer, an antioxidant, a dye, pigment and/or a mold-release agent, exceptionally preferably a heat stabilizer and/or a pigment.

It will be appreciated that only such additives may be added, and only in such amounts, if they do not significantly negatively impact the effect according to the invention of high CTI and good flame retardancy and preferably also do not lower the Vicat temperature, determined according to ISO 306:2014-3, VST method B, below 110 °C, preferably below 115 °C. Therefore, in addition to the phosphorus-containing flame retardants according to component C, it is particularly preferable for no more than 0.05% by weight of further flame retardants to be present.

The compositions according to the invention may indeed contain, in addition to component C, further flame retardants, but preferably are free of those selected from the group of alkali metal, alkaline earth metal or ammonium salts of aliphatic or aromatic sulfonic acid, sulfonamide or sulfonimide derivatives, and combinations thereof, with "derivatives" being understood to mean those compounds having a molecular structure that in place of a hydrogen atom or a functional group possesses a different atom or a different atom group or in which one or more atoms/atom groups has/have been removed. The parent compound is thus still recognizable.

Such flame retardants that are preferably not present in the compositions according to the invention are in particular one or more compounds selected from the group consisting of sodium or potassium perfluorobutanesulfate, sodium or potassium perfluoromethanesulfonate, sodium or potassium perfluorooctanesulfate, sodium or potassium 2,5-dichlorobenzenesulfate, sodium or potassium 2,4,5-trichlorobenzenesulfate, sodium or potassium diphenylsulfone sulfonate, sodium or potassium 2-formylbenzenesulfonate, sodium or potassium (N-benzenesulfonyl)benzenesulfonamide, or mixtures thereof, among these particularly preferably sodium or potassium perfluorobutanesulfate, sodium or potassium perfluorooctanesulfate, sodium or potassium diphenylsulfone sulfonate, or mixtures thereof, especially potassium perfluoro-1-butanesulfonate, which is commercially available, inter alia, as Bayowet® C4 from Lanxess, Leverkusen, Germany. It is very particularly preferable for no further flame retardants at all to be present.

Additives that are particularly preferably present are mold-release agents, further preferably based on a fatty acid ester, further preferably still based on a stearic ester, especially preferably based on pentaerythritol. Particular preference is given to using pentaerythritol tetrastearate (PETS) and/or glycerol monostearate (GMS). If one or more mold-release agents are used, the amount is preferably up to 1.0% by weight (inclusive), further preferably 0.01% to 0.7% by weight, particularly preferably 0.02% to 0.60% by weight, based in each case on the overall composition.

Additives that are particularly preferably present are also heat stabilizers. The amount of heat stabilizer is preferably up to 0.20% by weight, further preferably 0.01% to 0.10% by weight, further preferably still 0.01% to 0.05% by weight, particularly preferably 0.015% to 0.040% by weight, based on the overall composition.

Suitable heat stabilizers are in particular phosphorus-based stabilizers selected from the group of the phosphates, phosphites, phosphonites, phosphines and mixtures thereof. Examples include triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl)phosphite (Irgafos® 168), diisodecyl pentaerythritol diphosphite, bis(2,4-di-tert-butylphenyl) pentaerythritol diphosphite, bis (2,4-dicumylphenyl) pentaerythritol diphosphite (Doverphos® S-9228), bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl) pentaerythritol diphosphite, tristearyl sorbitol triphosphite, tetrakis(2,4-di-tert-butylphenyl)-4,4'-biphenylenediphosphonite, 6-isooctyloxy-2,4,8,10-tetra-tert-butyl-12H-dibenzo[d·g]-1,3,2-dioxaphosphocine, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyldibenzo[d·g]-1,3,2-dioxaphosphocine, 2,2',2"-nitrilo [triethyltris(3,3',5,5'-tetra-tert-butyl-1,1'-biphenyl-2,2'-diyl) phosphite], 2-ethylhexyl (3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, bis(2,6-di-tert-butyl-4-methylphenyl) pentaerythritol diphosphite, triphenylphosphine (TPP), trialkylphenylphosphine, bisdiphenylphosphinoethane or a trinaphthylphosphine. They are used alone or in a mixture, for example Irganox® B900 (mixture of Irgafos® 168 and antioxidant Irganox® 1076 in a 4:1 ratio) or Doverphos® S-9228 with Irganox® B900 or Irganox® 1076. Especially preferably, triphenylphosphine (TPP), Irgafos® 168 or tris(nonylphenyl) phosphite, or mixtures thereof, are used.

It is also possible to use phenolic antioxidants such as alkylated monophenols, alkylated thioalkylphenols, hydroquinones and alkylated hydroquinones. Particular preference is given to using Irganox® 1010 (pentaerythritol 3-(4-hydroxy-3,5-di-tert-butylphenyl) propionate; CAS: 6683-19-8) and Irganox 1076® (octadecyl 3-(3,5-di-tert-butyl-4-hydroxyphenyl) propionate), preferably in amounts of 0.05%-0.5% by weight.

It is also possible to add sulfonic esters or alkyl phosphates, for example mono-, di- and/or trihexyl phosphate, triisooctyl phosphate and/or trinonyl phosphate, as transesterification inhibitors. The alkyl phosphate used is preferably triisooctyl phosphate (tris-2-ethylhexyl phosphate). It is also possible to use mixtures of various mono-, di- and trialkyl phosphates. Triisooctyl phosphate is preferably used in amounts from 0.003% by weight to 0.05% by weight, further preferably 0.005% by weight to 0.04% by weight and particularly preferably from 0.01% by weight to 0.03% by weight, based on the overall composition.

Examples of impact modifiers are: core-shell polymers such as ABS or MBS; olefin-acrylate copolymers such as the Elvaloy® types from DuPont or Paraloid® types from Dow; silicone acrylate rubbers such as the Metablen® types from Mitsubishi Rayon Co., Ltd. The compositions according to the invention already have an exceptional profile of properties without additional impact modifiers. Compositions according to the invention are therefore preferably free of impact modifiers.

The compositions according to the invention do not contain any further fillers, such as barium sulfate, in addition to the talc. Titanium dioxide is not considered here to be a "filler", but rather an inorganic pigment according to component F.

If titanium dioxide is present, the compositions according to the invention preferably contain 0.1% to 2% by weight, preferably 0.5% to 1.2% by weight, of titanium dioxide.

The titanium dioxide of the compositions according to the invention preferably has an average particle size $D_{50}$, determined by means of scanning electron microscopy (STEM), of 0.1 to 5 μm, preferably 0.2 μm to 0.5 μm. However, the titanium dioxide may also have a different particle size, for example an average particle size $D_{50}$, determined by means of scanning electron microscopy (STEM), of ≥0.5 μm, for instance 0.65 to 1.15 μm.

The titanium dioxide preferably has a rutile structure.

The titanium dioxide used according to the invention is a white pigment, $Ti(IV)O_2$. In addition to titanium, colored titanium dioxides also contain elements such as Sb, Ni, Cr in significant amounts, so as to result in a color impression other than "white". It will be appreciated that traces of other elements may also be present as impurities in the titanium dioxide white pigment. However, these amounts are so small that the titanium dioxide does not take on any tint as a result.

Suitable titanium dioxides are preferably those produced by the chloride process, hydrophobized, specially after-treated and suitable for use in polycarbonate. Instead of sized titanium dioxide, unsized titanium dioxide or a mixture of both may in principle also be used in compositions according to the invention. However, the use of sized titanium dioxide is preferred.

Possible surface modifications of titanium dioxide include inorganic and organic modifications. These include for example aluminum- or polysiloxane-based surface modifications. An inorganic coating may contain 0.0% by weight to 5.0% by weight of silicon dioxide and/or aluminum oxide. An organic-based modification may contain 0.0% by weight to 3.0% by weight of a hydrophobic wetting agent. The titanium dioxide preferably has an oil absorption number, determined according to DIN EN ISO 787-5:1995-10, of 12 to 18 g/100 g of titanium dioxide, further preferably of 13 to 17 g/100 g of titanium dioxide, particularly preferably of 13.5 to 15.5 g/100 g of titanium dioxide.

Particular preference is given to titanium dioxide having the standard designation R2 according to DIN EN ISO 591-1:2001-08, which is stabilized with aluminum and/or silicon compounds and has a titanium dioxide content of at least 96.0% by weight. Such titanium dioxides are available under the brand names Kronos 2233 and Kronos 2230.

The polymer compositions according to the invention, containing the mixed components A, B, C, D, E, optionally F and optionally further constituents, may be prepared using powder premixes. It is also possible to use premixes of pellet materials or pellet materials and powders with the additions according to the invention. It is also possible to use premixes produced from solutions of the mixture components in suitable solvents, wherein homogenization is optionally effected in solution and the solvent is then removed. In particular, the additives referred to as component F and also further constituents of the compositions according to the invention can be introduced by known methods or in the form of a masterbatch. The use of masterbatches is preferred in particular for the introduction of additives and further constituents, with masterbatches based on the respective polymer matrix being used in particular.

The compositions according to the invention may for example be extruded. After extrusion, the extrudate may be cooled and comminuted. The combining and mixing of a premix in the melt may also be effected in the plasticizing unit of an injection molding machine. In this case, the melt is directly converted into a molded article in the subsequent step.

Compositions according to the invention are preferably used for the production of moldings for components from the EE sector, in particular for high-voltage switches, inverters, relays, electronic connectors, electrical connectors, circuit breakers, components for photovoltaic applications, electric motors, heat sinks, chargers or charging plugs for electric vehicles, electrical junction boxes, smart meter housings, miniature circuit breakers, busbars. The invention thus also provides moldings consisting of, or comprising regions made from, compositions according to the invention, and also corresponding components comprising elements, i.e. moldings, which consist of compositions according to the invention or comprise regions consisting of compositions according to the invention, which are referred to as "element made from a thermoplastic composition according to the invention".

The moldings consisting of, or comprising a region made from, a thermoplastic composition according to the invention or layers of a thermoplastic composition according to the invention are preferably used in those EE components that are designed for an operating voltage of at least 400 V, further preferably of at least 450 V. It can however also be designed for a typical household operating voltage of 230 V±23 V in Europe, although lower distances between the electrical conductors can now be achieved.

The high comparative tracking index of the polycarbonate compositions according to the invention makes it possible, using the polycarbonate material, to achieve smaller distances between two electrical conductors of a component than was previously possible with the use of polycarbonate.

The invention thus also provides an EE component, comprising a first electrical conductor and a second electrical conductor at a first distance d1 and a second distance d2 with respect to one another, which are connected via an element made from a thermoplastic composition according to the invention, the latter being in direct contact with the first electrical conductor and the second electrical conductor, wherein the distance d1 is the shortest distance between the first electrical conductor and the second electrical conductor along the surface of the element made from the thermoplastic composition and wherein the distance d2 is the shortest distance between the first electrical conductor and the second electrical conductor through the air, wherein d2 is selected in such a way that at the respective operating voltage a sparkover through the air is prevented and wherein d1, at the operating voltage U listed below, is:

d1i(0 V≤U≤250 V): 1.8 mm to <2.5 mm d1ii(250 V<U≤500 V)=3.6 mm to <5.0 mm d1iii(500 V<U≤1000 V)=7.1 mm to <10.0 mm.

Such small distances are only achievable with a material that has at least a CTI of 400 V.

The invention thus also provides corresponding EE components in which corresponding distances are achieved and which preferably have an operating voltage to be applied of at least 400 V, preferably of at least 450 V.

It is well known that the degree of soiling affects the electrical conductivity. The distances d1 and d2 mentioned are usable in practice in components in which, for example due to structural shielding, an IP6K9K degree of protection according to ISO 20653:2013-02 is adhered to.

The selection of d2 is within the ability of those skilled in the art. Preferably, d2 is at least 1.2 mm.

The invention further provides for the use of talc to increase the comparative tracking index of an on bisphenol A homopolycarbonate based thermoplastic composition. Such a specific use also exists, for example, when a corresponding composition is used for an insulation layer which, because of the application, requires a CTI of 400 V. For example, the composition according to the invention may be used as an insulation layer for other electrical components, for example transistors. The electrical components of a transistor are protected by overmolding with a plastic having high CTI. The plastic protects the electrical components both from contact and from unwanted electrical interaction with adjoining metallic components—such as a metallic heat sink—or electrical components.

Transistors are also frequently applied directly to a heat sink because of the high evolution of heat in operation. Here too, the thermoplastic composition according to the invention introduced between heat sink and transistor ensures safe operation.

A further field of use is that of mounting brackets for busbars, where it is likewise necessary to use materials having a high CTI. The mounting brackets have essentially two functions: fixing of the busbars in the assembly group in order to prevent any change in position in operation, and action as spacers, in order to be able to run several busbars in parallel, where it is necessary here too for a sufficiently large distance to be chosen between the two busbars to prevent sparkover through air. In addition, however, tracking on the surface of the mounting bracket must be prevented between the busbars, but also between the busbar and other metallic components, for example the screws for securing the mounting brackets on the structure beneath. Mounting brackets having a high CTI can increase component density and energy density here.

In the case of plug connectors, plug devices and sockets, there is a high risk of tracking current formation that can lead to electrical failure and possible fire. A housing that seals current-carrying wires can improve the situation, since the risk of soiling is low. Plug connectors for chargers or else USB-C plug connectors have an elevated risk since the current-carrying conductor tracks cannot be covered or sealed and, moreover, are exposed to soiling such as perspiration, moisture, fabric particles, dust and other materials. A high-CTI material is needed to offer sufficient protection from tracking, but also in order to enable miniaturization or an increase in power density.

The invention likewise provides for the use of compositions according to the invention, also in the embodiments described as preferred, particularly preferred etc., for achieving the aforementioned small distances between electrical conductors in EE components.

Of course, the features mentioned as preferred, particularly preferred etc. for the composition also apply with regard to the uses according to the invention.

Thermoplastic compositions that are preferred according to the invention belong to insulating material group II (400 V≤CTI<600 V), classified according to DIN EN 60664-1:2008.

They have a thermal conductivity (in-plane) of preferably at least 1.0 W/(mK), preferably of at least 1.1 W/(mK), determined according to ASTM E 1461-13, and so good heat dissipation can additionally be achieved.

Various embodiments of the present invention are described below:

1. A thermoplastic composition, containing
   A) at least 50% by weight of bisphenol A homopolycarbonate,
   B) 32% to 37% by weight of talc,
   C) 4% to 10% by weight of phosphorus-containing flame retardant,
   D) 0.3% to 2% by weight of fluorine-containing anti-drip agent,
   E) 1% to 3% by weight of anhydride-modified α-olefin polymer, wherein the composition does not contain any further fillers.
2. The thermoplastic composition according to embodiment 1, wherein the talc content of the thermoplastic composition is 34% to 36% by weight.
3. The thermoplastic composition according to embodiment 1 or 2, wherein the talc content of the thermoplastic composition is 34.5% to 35.5% by weight.
4. The thermoplastic composition according to any of the preceding embodiments, wherein the amount of fluorine-containing anti-drip agent is 0.4% to 1.0% by weight.
5. The thermoplastic composition according to any of the preceding embodiments, wherein the amount of aromatic polycarbonate is at least 54% by weight.
6. The thermoplastic composition according to any of the preceding embodiments, not containing any further polycarbonate.
7. The thermoplastic composition according to any of the preceding embodiments, wherein the phosphorus-containing flame retardant is a phosphazene or a mixture of different phosphazenes.
8. The thermoplastic composition according to any of the preceding embodiments, wherein the anhydride-modified α-olefin polymer comprises maleic anhydride-modified propylene polymer, preferably is such a polymer.
9. The thermoplastic composition according to any of the preceding embodiments, wherein the composition contains 0.1% to 2% by weight of titanium dioxide.
10. The thermoplastic composition according to any of the preceding embodiments, containing 5% to 8% by weight of phosphorus-containing flame retardant.
11. The thermoplastic composition according to any of the preceding embodiments, containing as further component
    F) one or more additives, selected from the group consisting of heat stabilizers, antioxidants, mold-release agents, UV absorbers, IR absorbers, impact modifiers, antistats, optical brighteners, light-scattering agents, hydrolysis stabilizers, transesterification stabilizers, organic dyes, organic or inorganic pigments, compatibilizers, additives for laser marking.
12. The thermoplastic composition according to any of the preceding embodiments, wherein the composition is free of impact modifiers and blend partners.
13. The thermoplastic composition according to any of the preceding embodiments, containing
    A) at least 50% by weight of bisphenol A homopolycarbonate,
    B) 34% to 36% by weight of talc,
    C) 5% to 8% by weight of phosphorus-containing flame retardant,
    D) 0.3% to 1% by weight of fluorine-containing anti-drip agent,
    E) 1% to 2% by weight of anhydride-modified α-olefin polymer.
14. The thermoplastic composition according to any of the preceding embodiments, also containing
    F) one or more additives, selected from the group consisting of heat stabilizers, antioxidants, mold-release agents, UV absorbers, IR absorbers, antistats, optical brighteners, light-scattering agents, hydrolysis stabilizers, transesterification stabilizers, organic dyes, organic or inorganic pigments, compatibilizers, additives for laser marking.
15. The thermoplastic composition according to any of the preceding embodiments, not containing any further components other than each of those mentioned above.
16. A thermoplastic composition, consisting of
    A) at least 50% by weight of bisphenol A homopolycarbonate,
    B) 34% to 36% by weight of talc,
    C) 5% to 8% by weight of phosphorus-containing flame retardant,
    D) 0.3% to 1% by weight of fluorine-containing anti-drip agent,
    E) 1% to 2% by weight of anhydride-modified α-olefin polymer,
    F) 0.1% to 2% by weight of titanium dioxide,
    G) one or more additives, selected from the group consisting of heat stabilizers, antioxidants, mold-release agents, UV absorbers, IR absorbers, antistats, optical brighteners, light-scattering agents, hydrolysis stabilizers, transesterification stabilizers, organic dyes, organic or inorganic pigments, compatibilizers, additives for laser marking.
17. The thermoplastic composition according to any of the preceding embodiments, wherein the phosphorus-containing flame retardant comprises a cyclic phosphazene and/or a phosphorus compound of formula (10).
18. The thermoplastic composition according to any of the preceding embodiments, wherein the phosphorus-containing flame retardant is a cyclic phosphazene and/or a phosphorus compound of formula (10)

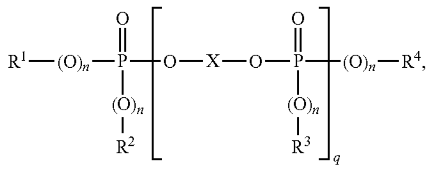

(10)

in which $R^1$, $R^2$, $R^3$ and $R^4$ are independently a $C_1$- to $C_8$-alkyl radical, in each case optionally halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl, and/or halogen, preferably chlorine and/or bromine, n is independently 0 or 1, q is a value from 0 to 30 and X is a mono- or polycyclic aromatic radical having 6 to 30 carbon atoms or a linear or branched aliphatic radical having 2 to 30 carbon atoms, each of which may be substituted or unsubstituted, and bridged or unbridged.

19. The thermoplastic composition according to embodiment 17 or 18, wherein the cyclic phosphazene is a phosphazene of formula (13)

(13)

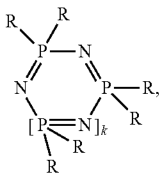

where

R in each case is identical or different and is
an amine radical,
an in each case optionally halogenated, preferably fluorine-halogenated, further preferably monohalogenated, $C_1$- to $C_8$-alkyl radical, preferably methyl radical, ethyl radical, propyl radical or butyl radical,
a $C_1$- to $C_8$-alkoxy radical, preferably a methoxy radical, ethoxy radical, propoxy radical or butoxy radical,
an in each case optionally alkyl-substituted, preferably $C_1$- to $C_4$-alkyl-substituted, and/or halogen-substituted, preferably chlorine- and/or bromine-substituted, $C_5$- to $C_6$-cycloalkyl radical,
an in each case optionally alkyl-substituted, preferably $C_1$- to $C_4$-alkyl-substituted, and/or halogen-substituted, preferably chlorine-, bromine-, and/or hydroxy-substituted, $C_6$- to $C_{20}$-aryloxy radical, preferably phenoxy radical, naphthyloxy radical,
an in each case optionally alkyl-substituted, preferably $C_1$- to $C_4$-alkyl-substituted, and/or halogen-substituted, preferably chlorine- and/or bromine-substituted, $C_7$- to $C_{12}$-aralkyl radical, preferably phenyl-$C_1$- to $C_4$-alkyl radical, or
a halogen radical, preferably chlorine or fluorine, or
an OH radical, k is a whole number from 1 to 10, preferably a number from 1 to 8, particularly preferably 1 to 5, very particularly preferably 1.

20. The thermoplastic composition according to embodiment 17, 18 or 19, wherein the phosphorus compound of formula (10) is a bisphenol A-based oligophosphate of formula (12)

(12)

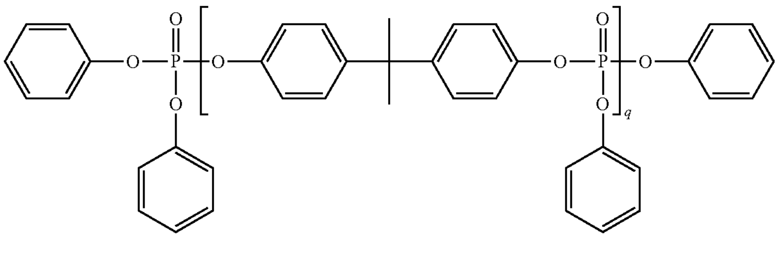

with q=1 to 20, in particular with q=1.0 to 1.2.

21. The thermoplastic composition according to any of the preceding embodiments, wherein the anhydride-modified α-olefin polymer according to component E is based on propene, is maleic anhydride-modified and preferably has an average molecular weight $M_w$, determined by means of gel permeation chromatography in ortho-dichlorobenzene at 150 °C with polystyrene calibration, of 1000 to 22 000 g/mol, preferably 3000 to 21 000 g/mol, and an acid number of 45 to 170 mg KOH/g, preferably of 50 to 100 mg KOH/g, determined according to DIN ISO 17025:2005-08 by means of potentiometric titration.

22. The thermoplastic composition according to embodiment 21, wherein the MVR of the aromatic bisphenol A homopolycarbonate used, determined according to ISO 1133:2012-03, at a test temperature of 300 °C and with 1.2 kg load, is 11 to 15 $cm^3$/(10 min).

23. A molding consisting of, or comprising a region made from, a thermoplastic composition according to any of the preceding embodiments.

24. The molding according to embodiment 23, wherein the molding is part of a high-voltage switch, inverter, relay, electronic connector, electrical connector, circuit breaker, a photovoltaic system, an electric motor, a heat sink, a charger or charging plug for electric vehicles, an electrical junction box, a smart meter housing, a miniature circuit breaker, a busbar.

25. An EE component, which is designed for an operating voltage of at least 375 V, comprising a molding according to embodiment 23 or 24 or a layer made from a thermoplastic composition according to any of embodiments 1 to 22.

26. An EE component, which is designed for an operating voltage of 400 V, comprising a molding according to embodiment 23 or 24 or a layer made from a thermoplastic composition according to any of embodiments 1 to 22.

27. An EE component, comprising
a first electrical conductor and a second electrical conductor at a first distance d1 and a second distance d2 with respect to one another,
which are connected via an element made from a thermoplastic composition according to any of embodiments 1 to 22, which is in direct contact with the first electrical conductor and the second electrical conductor,
wherein the distance d1 is the shortest distance between the first electrical conductor and the second electrical conductor along the surface of the element made from the thermoplastic composition and wherein the distance d2 is the shortest distance between the first electrical conductor and the second electrical conductor through the air,
wherein d2 is selected in such a way that at the respective operating voltage a sparkover through the air is prevented and
wherein d1, at the operating voltage U listed below, is:
d1i(0 V≤U≤250 V): 1.8 mm to <2.5 mm
d1ii(250 V<U≤500 V)=3.6 mm to <5.0 mm
d1iii(500 V<U≤1000 V)=7.1 mm to <10.0 mm.

28. The EE component according to any of embodiments 25 to 27, wherein d2 is ≥1.2 mm.
29. The EE component according to any of embodiments 25 to 28, wherein the EE component is a high-voltage switch, inverter, relay, electronic connector, electrical connector, circuit breaker, part of a photovoltaic system, part of an electric motor, of a charger or charging plug for electric vehicles, part of an electrical junction box, part of a smart meter housing, part of a miniature circuit breaker, part of a busbar.
30. The EE component according to any of embodiments 25 to 30, with an IP6K9K degree of protection according to ISO 20653:2013-02.

EXAMPLES

1. Description of Raw Materials and Test Methods a) Raw Materials

Component A-1: Linear polycarbonate based on bisphenol A having a melt volume flow rate of 12 $cm^3$/(10 min) (according to ISO 1133:2012-03, at a test temperature of 300 °C and with 1.2 kg load) containing as component F-2 250 ppm (=0.025% by weight, based on the total weight of component A) of triphenylphosphine heat stabilizer.

Component B-1: Compacted talc having a talc content of 98% by weight, an iron oxide content of 1.9% by weight, an aluminum oxide content of 0.2% by weight, ignition loss (DIN 51081:2002/1000 °C) of 5.4% by weight, pH (according to EN ISO 787-9:1995) of 9.15, D (0.5) (sedimentation analysis) of 2.2 μm; BET surface area according to ISO 4652:2012-06 of 10 $m^2$/g, brand: Finntalc M05SLC, manufacturer: Elementis Minerals B.V.

Component B*-2: Glass fiber from Nittobo (2-4-1, Kojimachi, Chiyoda-ku, Tokyo 102-8489, Japan) which is available under the trade name CSG 3PA-830. This is a flat glass fiber having a cut length of 3 mm and a cross-sectional ratio of 1.4.

Component B*-3: Amosil FW 600 fired silicon dioxide from Quarzwerke GmbH in Frechen, unsized, with an average particle size D (0.5) of approx. 4 μm, D (0.98) of approx. 13 μm, a D (0.1)/D (0.9) ratio of approx. 1.5/10 and a specific surface area of approx. 6 $m^2$/g, determined according to DIN-ISO 9277:2014-01.

Component C-1: Rabitle FP110 phenoxycyclophosphazene from Fushimi Pharmaceutical, Japan, formula (13g), with a trimer proportion (k=1) of approximately 68 mol %.

Component D-1: ADS5000 SAN-encapsulated polytetrafluoroethylene (approx. 50% by weight PTFE (fluorine-containing anti-drip agent) and approx. 50% by weight SAN) from Chemical Innovation Co., Ltd. Thailand.

Component E-1: Propylene-maleic anhydride polymer having an average molecular weight (gel permeation chromatography in ortho-dichlorobenzene at 150 °C with polystyrene calibration) $M_w$=20 700 g/mol, Mn=1460 g/mol, acid number 78 mg KOH/g, determined according to DIN ISO 17025:2005-08 by means of potentiometric titration.

Component F-1: Titanium dioxide from Kronos having a $D_{50}$=210 nm (scanning electron microscopy, ECD method; Kronos® 2230).

b) Test Methods

Comparative Tracking Index (CTI):

In order to determine the comparative tracking index, the compositions described here were tested according to the rapid test method based on IEC 60112:2009. To this end, a 0.1% ammonium chloride test solution (395 ohm*cm resistance) was applied dropwise, between two neighboring electrodes spaced apart by 4 mm, to the surface of test specimens of dimensions 60 mm×40 mm×4 mm at a time interval of 30 s. A test voltage was applied between the electrodes and was varied over the course of the test. The first test specimen was tested at a starting voltage of 300 V or 350 V. A maximum of 50 drops (one drop every 30 s) in total were applied per voltage as long as no tracking current >0.5 A over 2 s occurred or the sample burned. After 50 drops, the voltage was increased by 50 V and a new test specimen was tested at this higher voltage, according to the procedure described above. This process was continued until either 600 V was reached or a tracking current or burning occurred. If one of the above-mentioned effects already occurred with fewer than 50 drops, the voltage was reduced by 25 V and a new test specimen was tested at this lower voltage. The voltage was reduced until the test was passed with 50 drops without tracking current or burning. This procedure was therefore used to determine the maximum possible voltage at which a composition was able to withstand 50 drops of the test solution without occurrence of a tracking current. Lastly, four further test specimens were tested at the determined maximum voltage with 50 drops each for confirmation. This confirmed value is reported as the CTI in the examples. A 100-drop value was not determined, hence "rapid test method based on" the specified standard.

PTI (Proof Tracking Index):

The PTI is tested based on IEC 60112:2009, modified as described below. To this end, a 0.1% ammonium chloride test solution (395 ohm*cm resistance) was applied dropwise, between two neighboring electrodes spaced apart by 4 mm, to the surface of test specimens of dimensions 60 mm×40 mm×4 mm at a time interval of 30 s. In contrast to the CTI testing, in the PTI testing a fixed test voltage is applied between the electrodes and a total of 5 test specimens are tested at the respective voltage. A maximum of 50 drops (one drop every 30 s) in total were applied per test specimen as long as no tracking current >0.5 A over 2 s occurred or the sample burned.

Flame Retardancy:

The flame retardancy of the polycarbonate compositions was tested according to Underwriters Laboratories method UL94V at a thickness of 2 mm.

Various fire classes are assigned depending on the behavior of the test specimens. This includes the time until the flame is extinguished, resistance to dripping, or whether a material produces burning drips. The classes determined hereafter are designated V0, V1 and V2 and are ascertained on the basis of a total of five tested test specimens.

V0: The test specimen, positioned with its longitudinal axis 180° (vertical) to the flame, has an average afterflame time after removal of the flame of not more than 10 s and does not produce any dripping plastic particles that ignite cotton wool located under the test specimen. The total afterflame time of five test specimens, in each case with two times flame application, is at most 50 s.

V1: In contrast to V0, the average maximum afterflame time here is <30 s, and here too no dripping particles or ignition of the cotton wool are permitted. The total afterflame time of five test specimens, in each case with two times flame application, is <250 s.

V2: In contrast to V0 and V1, dripping plastic particles that ignite the cotton wool are formed in this classification. The individual afterflame times are <30 s and the total afterflame time of 5 test specimens, in each case with two times flame application, is <250 s.

f.: The test does not deliver a flame retardancy classification if the afterflame times are exceeded.

FOT: Flame Out Time (afterflame time), reported in seconds.

Heat Distortion Resistance:

The heat distortion resistance of the compositions was determined on the basis of the Vicat softening temperature (method B, test force 50 N, heating rate 50 K/h) on test specimens having the dimensions 80 mm×10 mm×4 mm according to ISO 306:2014-3.

Thermal Conductivity:

The thermal conductivity was determined on injection-molded test specimens having the dimensions 60×60×2 $mm^3$ according to ASTM E 1461 (Nano Flash method). "In-plane" means measured in the x,y direction, "through-plane" in the z direction.

2. Production of the Test Specimens

The compositions were prepared on a BUSS kneader. The melt temperature, rotational speed, throughput and torque had to be adjusted according to the procedure that is common knowledge to those skilled in the art and tailored to the respective composition. The filler was metered in as a "split-feed", where 10% by weight of filler of the total amount was added via the main intake and the remainder was added via the side extruder. The test specimens having the dimensions 60 mm×40 mm×4 mm were produced from the molding compounds using standard injection molding methods at a melt temperature of 280 °C and a mold temperature of 80 °C.

3. Results

In the tables below, "n.t." means "not tested" and "f." means "failed".

TABLE 1

| | | V-1 | V-2 | V-3 | V-4 | V-5 | V-6 | E-7 | E-8 | V-9 | V-10 | V-11 | V-12 |
|---|---|---|---|---|---|---|---|---|---|---|---|---|---|
| A-1 | % by wt. | 67.0 | 62.0 | 56.5 | 62.0 | 55 | 59.5 | 57.0 | 54.0 | 57.0 | 57.0 | 51.5 | 48.5 |
| B-1 | % by wt. | 30.00 | 35.00 | 40.00 | 30.0 | 30.0 | 35.0 | 35.0 | 35.0 | | | 40.0 | 40.0 |
| B*-2 | % by wt. | | | | | | | | | 35.0 | | | |
| B*-3 | % by wt. | | | | | | | | | | 35.0 | | |
| C-1 | % by wt. | 0 | 0 | 0 | 5.0 | 12.0 | 2.5 | 5.0 | 8.0 | 5.0 | 5.0 | 5.0 | 8.0 |
| D-1 | % by wt. | 0.5 | 0.5 | 0.5 | 0.5 | 0.5 | 0.5 | 0.5 | 0.5 | 0.5 | 0.5 | 0.5 | 0.5 |
| E-1 | % by wt. | 1.5 | 1.5 | 2.0 | 1.5 | 1.5 | 1.5 | 1.5 | 1.5 | 1.5 | 1.5 | 2.0 | 2.0 |
| F-1 | % by wt. | 1.0 | 1.0 | 1.0 | 1.0 | 1.0 | 1.0 | 1.0 | 1.0 | 1.0 | 1.0 | 1.0 | 1.0 |
| Vicat temperature | ° C. | 144 | 145 | 144 | 130 | 106 | 139 | 127 | 115 | 124 | 126 | 124 | 113 |
| CTI | V | 325 | 350 | 450 | 325 | 350 | 325 | 450 | 550 | 225 | 225 | 500 | 550 |
| PTI | 250 V | | | | | | | pass | | | | | |
| | 300 V | | | | | | | pass | | | | | |
| | 350 V | | | | | | | pass | pass | | | | |
| | 400 V | | | | | | | pass | pass | | | | |
| | 500 V | | | | | | | pass | pass | | | | |
| | 600 V | | | | | | | 3/5 | 4/5 | | | | |
| UL94V - 2.0 mm (overall assessment) | | V1 | f. | f. | V0 | V0 | f. | V0 | V0 | V0 | V0 | f. | f. |
| FOT 2d | s | 35 | 180 | 196 | 17 | 8 | 205 | 11 | 11 | 14 | 12 | 162 | 117 |
| Thermal conductivity, in-plane | W/(mK) | 1.11 | 1.34 | 1.59 | 0.96 | 1.30 | 1.17 | 1.12 | 1.27 | 0.33 | 0.34 | 1.42 | 1.80 |
| Thermal conductivity, through-plane | W/(mK) | 0.25 | 0.28 | 0.31 | 0.24 | 0.30 | 0.28 | 0.23 | 0.27 | 0.25 | 0.28 | 0.27 | 0.31 |

Table 1 shows how the CTI tends to improve with increasing amount of talc (V-1-V-3). However, without addition of flame retardant, the flammability increases with increasing amount of talc (see afterflame times). Comparing Examples V-4, E-7 and V-11, which each contain 5% by weight of flame retardant, the trend of increasing CTI (325 V-450 V-500 V) with increasing amount of talc can also be seen here. No more than 10% by weight of flame retardant, preferably no more than 8% by weight of flame retardant, should be used so that the heat distortion resistance is not reduced too far, which would generally call into question the use of polycarbonate. With other reinforcing fillers such as glass fiber or quartz, it is not possible to achieve high comparative tracking indexes as is the case with talc in combination with an FR package (cf. V2 with V-9 and V-10).

The invention claimed is:

1. A thermoplastic composition, containing

A) at least 50% by weight of bisphenol A homopolycarbonate,

B) 32% to 37% by weight of talc,

C) 4% to 10% by weight of phosphorus-containing flame retardant,

D) 0.3% to 2% by weight of fluorine-containing anti-drip agent,

E) 1% to 3% by weight of anhydride-modified α-olefin polymer, wherein the composition does not contain any further fillers.

2. The thermoplastic composition as claimed in claim 1, not containing any further polycarbonate.

3. The thermoplastic composition as claimed in claim 1, containing 5% to 8% by weight of phosphorus-containing flame retardant.

4. The thermoplastic composition as claimed in claim 1, wherein the anhydride-modified a-olefin polymer comprises maleic anhydride-modified propylene polymer.

5. The thermoplastic composition as claimed in claim 1, containing 34% to 36% by weight of talc.

6. The thermoplastic composition as claimed in claim 1, containing as further component F) one or more additives, selected from the group consisting of heat stabilizers, antioxidants, mold-release agents, UV absorbers, IR absorbers, impact modifiers, antistats, optical brighteners, light-scattering agents, hydrolysis stabilizers, transesterification stabilizers, organic dyes, organic or inorganic pigments, compatibilizers, additives for laser marking.

7. The thermoplastic composition as claimed in claim 1, containing 0.1% to 2% by weight of titanium dioxide.

8. The thermoplastic composition as claimed in claim 1, containing

A) at least 50% by weight of bisphenol A homopolycarbonate,

B) 34% to 36% by weight of talc,

C) 5% to 8% by weight of phosphorus-containing flame retardant,

D) 0.3% to 1% by weight of fluorine-containing anti-drip agent,

E) 1% to 2% by weight of anhydride-modified α-olefin polymer.

9. The thermoplastic composition as claimed in claim 8, also containing

F) one or more additives, selected from the group consisting of heat stabilizers, antioxidants, mold-release agents, UV absorbers, IR absorbers, antistats, optical brighteners, light-scattering agents, hydrolysis stabilizers, transesterification stabilizers, organic dyes, organic or inorganic pigments, compatibilizers, additives for laser marking, wherein 0.1% to 2% by weight of titanium dioxide is present.

10. The thermoplastic composition as claimed in claim 1, not containing any further components other than those mentioned above.

11. A molding consisting of, or comprising a region made from, a thermoplastic composition as claimed in claim 1.

12. The molding as claimed in claim 11, wherein the molding is part of a high-voltage switch, inverter, relay, electronic connector, electrical connector, circuit breaker, a photovoltaic system, an electric motor, a heat sink, a charger or charging plug for electric vehicles, an electrical junction box, a smart meter housing, a miniature circuit breaker, or a busbar, wherein the EE component has an IP6K9K degree of protection according to ISO 20653:2013-02.

13. An EE component; comprising a molding as claimed in claim 11.

14. The EE component as claimed in claim 13, comprising a first electrical conductor and a second electrical conductor at a first distance d1 and a second distance d2 with respect to one another, which are connected via a-the thermoplastic composition, which is in direct contact with the first electrical conductor and the second electrical conductor, wherein the distance d1 is the shortest distance between the first electrical conductor and the second electrical conductor along the surface of the thermoplastic composition and wherein the distance d2 is the shortest distance between the first electrical conductor and the second electrical conductor through the air, wherein d2 is selected in such a way that at the respective operating voltage a sparkover through the air is prevented and wherein d1, at the operating voltage U listed below, is:

d1i (0V≤U≤250 V): 1.8 mm to <2.5 mm d1ii (250V<U≤500 V) =3.6 mm to <5.0 mm d1iii (500 V<U≤1000 V) =7.1 mm to <10.0 mm.

15. A method for increasing the comparative tracking index of a bisphenol A homopolycarbonate-based thermoplastic composition comprising providing the thermoplas sition as claimed in claim 1.

16. An EE component comprising a layer made from a thermoplastic composition as claimed in claim 1.

* * * * *